United States Patent [19]

Rhodes

[11] Patent Number: 4,876,947

[45] Date of Patent: Oct. 31, 1989

[54] PISTONS WITH BEARING LANDS

[75] Inventor: Michael L. P. Rhodes, Rugby, England

[73] Assignee: AE PLC, Cawston, England

[21] Appl. No.: 27,876

[22] Filed: Mar. 19, 1987

[30] Foreign Application Priority Data

Mar. 20, 1986 [GB] United Kingdom ................. 8606998

[51] Int. Cl.⁴ ............................. F16J 1/14; F22B 5/00

[52] U.S. Cl. .......................................... 92/187; 92/216; 92/237; 123/193 P

[58] Field of Search ................. 92/187, 212, 313, 190, 92/224, 232, 237, 216; 123/193 P, 48 B

[56] References Cited

U.S. PATENT DOCUMENTS

| | | | |
|---|---|---|---|
| 1,652,385 | 12/1927 | Walker . | |
| 1,926,329 | 9/1933 | Chilton | 92/237 |
| 1,929,831 | 10/1933 | Teetor | 92/224 |
| 2,315,403 | 3/1943 | Fillon . | |
| 2,817,562 | 12/1957 | Fleming et al. | 92/212 |
| 4,207,808 | 6/1980 | Elsbett et al. | 92/216 |
| 4,358,881 | 11/1982 | Mahrus et al. | 92/190 |

FOREIGN PATENT DOCUMENTS

| | | | |
|---|---|---|---|
| 222359 | 5/1987 | European Pat. Off. . | |
| 708442 | 6/1941 | Fed. Rep. of Germany | 92/224 |
| 863430 | 7/1949 | Fed. Rep. of Germany . | |
| 3039382 | 4/1982 | Fed. Rep. of Germany | 123/193 P |
| 1593248 | 11/1968 | France . | |
| 258533 | 5/1928 | Italy | 92/224 |
| 401581 | 11/1933 | United Kingdom | 92/224 |
| 2164419 | 3/1986 | United Kingdom . | |

*Primary Examiner*—Robert E. Garrett
*Assistant Examiner*—Thomas Denion
*Attorney, Agent, or Firm*—William R. Hinds

[57] ABSTRACT

Pistons are discribed comprising a crown portion which also includes a piston ring belt and gudgeon-pin bosses and which crown portion comprises a ferrous allow and a seperate articulated skirt portion comprising a casting of aluminum alloy, steel or cast iron which also includes gudgeon-pin bores, the crown portion and the skirt portion having a common gudgeon-pin about which the articulated skirt portion is freely able to move relative to the crown portion.

3 Claims, 2 Drawing Sheets

PISTONS WITH BEARING LANDS

The present invention relates to pistons and particularly to pistons of the articulated type.

Pistons generally comprise three distinct portions; the crown portion which includes the piston ring groove belt, the gudgeon-pin boss portion and the skirt portion. Pistons, heretofore, have mainly been produced from aluminium alloys. With ever increasing demands for improved power output, fuel economy and emission reductions aluminium alloys are showing strength limitations in the crown and pin boss regions especially in diesel engines. Much attention is now being paid to pistons in steel and cast-iron.

Steel or cast-iron is better able to withstand the thermal and mechanical loads imposed on the crown in the highest rated engines. The piston ring grooves are more wear-resistant and may be positioned nearer to the crown top surface because of lower thermal conductivity. Gudgeon-pin bosses in ferrous material are also better able to withstand the firing loads at higher temperatures without cracking than are aluminium alloys.

One disadvantage with a single piece ferrous alloy piston may be in increased weight although with modern designs and production techniques for thin wall casting the weight may be no more than a comparable aluminium alloy piston. The use of non-ferrous or plastics materials in the skirt portion, however, has certain intrinsic advantages. These advantages generally relate to the bearing properties of such materials which are generally superior to ferrous alloys, especially in lubricated contact with a cast-iron cylinder bore. This does not, however, preclude the use of ferrous alloy skirt portions which may be employed in some engine applications or may have surface treatments or coatings to improve the compatibility of the piston skirt with the cylinder bore.

Articulated pistons have several advantages. Crown and hence piston ring stability is greatly enhanced since side loads imposed on the crown portion are small and attributable mainly to gudgeon pin friction. Contact between crown and cylinder bore is usually also greatly reduced due to the removal of significant side thrusts and hence sideways motion and piston lands are therefore able to run with smaller clearances. This latter feature is beneficial with respect to improved fuel efficiency and lower emissions. Because the skirt portion of the piston is effectively isolated from the crown portion except for conduction of heat via the gudgeon pin the skirt portion of an articulated piston may run significantly cooler than in a one-piece piston. Because of the lower running temperature of the skirt portion there is considerable freedom of choice of materials. Thus the materials of the crown portion and the skirt portion may be more effectively optimised in respect of the duties required of each. Skirt design freedom may also be enhanced by relative independence from the crown portion.

According to the present invention, there is provided a piston comprising a crown portion which also includes a piston ring belt and gudgeon-pin bosses and which crown portion comprises a casting of steel or cast-iron and a separate articulated skirt portion comprising a casting of aluminum alloy, steel or cast-iron which also includes gudgeon-pin bores, said crown portion and said skirt portion having a common gudgeon-pin about which said articulated skirt portion is freely able to move relative to said crown portion, wherein portions of the skirt which cooperate with an associated cylinder or cylinder liner comprise axially-spaced circumferentially extending bearing lands, and the circumferentially extending bearing lands are arcuate, load bearing skirt lands supported by struts depending from gudgeon-pin boss pieces of the skirt portion.

Such lands in cast monolithic skirt constructions may be provided in the form of separate distinct lands supported by struts depending from the associated gudgeon-pin boss and the lands not being connected to each other in any way other than via the struts and gudgeon-pin bosses. It has been found that such a construction permits a closer fit between the skirt and associated cylinder and thus assits in lowering the noise generated by the piston. The closer fit is permitted due to the enhanced conformability of the skirt lands with the cylinder surface which tends to distort due to local temperature variations. This type of skirt construction may be applicable to cast aluminium alloys and to ferrous castings having surface treatments or coatings on the bearing lands.

Separated bearing lands may alternatively be provided by removal of intervening skirt portions.

Spaced-apart bearing lands provide lower friction due to lower rubbing areas than conventional skirts where high-area oil films increase the viscous drag between piston and cylinder. Spaced-apart lands also tend to be inherently better lubricated due to unimpeded access of oil to the contact surfaces.

In order that the present invention may be more fully understood examples will now be described by way of illustration only with reference to the accompanying drawings of which:

Figure 3:
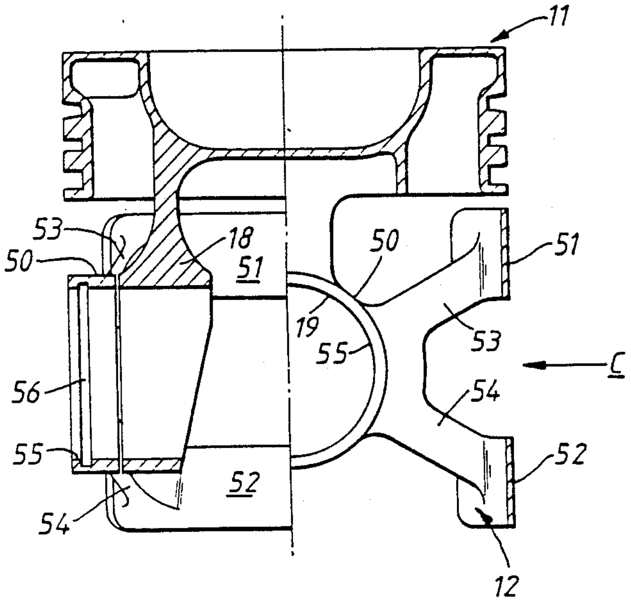

FIG. 3 which shows a sectioned view of a piston in two mutually perpendicular planes, the section on the left being through a plane including both the gudgeon-pin and piston axes and that on the right is viewed in the direction of arrow 'C' parallel to the gudgeon-pin axis.

Figure 1:
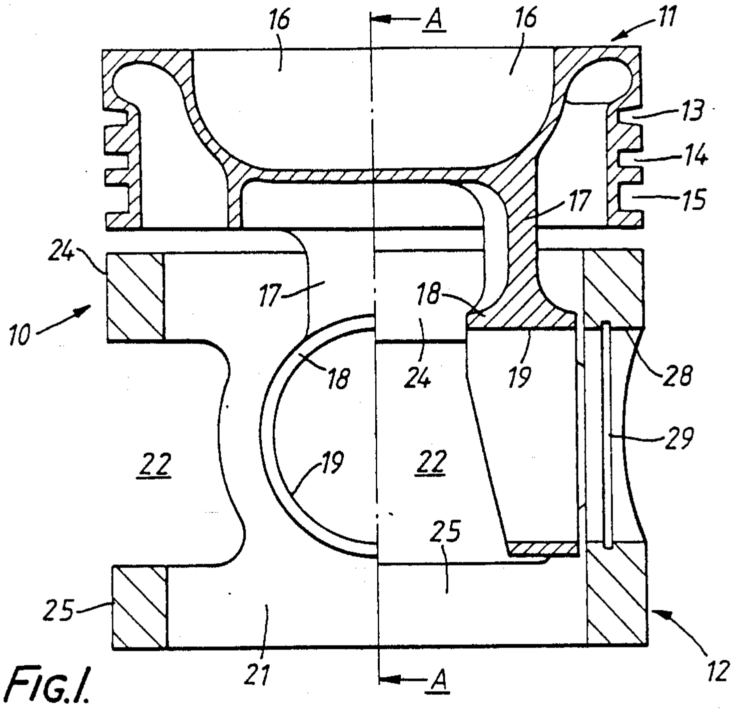
FIG. 1 shows a view of a piston according to the present invention sectioned in two mutually perpendicular planes, one plane being that which includes both the gudgeon pin axis and the piston axis; the half-section on the left being viewed in the direction of the gudgeon-pin axis and the half-section on the right being viewed normal to the gudgeon-pin in the direction of arrows 'A'.

Referring now to FIG. 1 and where a piston is denoted generally at 10. The piston comprises two separate components; a crown portion 11 and a skirt portion 12. The crown portion 11 consists of a stainless steel casting having piston ring grooves 13, 14 and 15, a combustion bowl 16, pillars 17 depending from the bowl 16, the pillars 17 further including gudgeon pin bosses 18 having bores 19. The skirt portion 12 consists of an aluminium alloy casting 21 of basically cylindrical form of which portions 22 have been machined away to leave bearing lands 24 and 25 to support the thrust side loads. The skirt portion 12 further includes gudgeon-pin bores 28 having circlip grooves 29 for location of a common gudgeon pin (not shown). The bores 19 and 28 are both substantially equal diameter.

The piston of FIG. 2 again shows a steel crown portion casting 11 similar to that of FIG. 1. The skirt portion 12 however comprises a complex aluminium alloy die-casting which comprises pin-boss pieces 30 having bores 31, lands 32 and 33 which are supported by struts 34 and 35 depending from the boss pieces 30, the bores 19 and 31 again being of substantially equal diameter for support by a common gudgeon-pin 30 (not shown).

FIG. 3 shows a piston comprising a stainless steel crown portion 11 and a steel skirt portion 12. The crown portion is essentially as described with reference to the preceding figures. The skirt portion 12 comprises an investment casting having pin boss pieces 50, thin wall, arcuate load bearing skirt lands 51 and 52 supported on the boss pieces 50 by struts 53 and 54 depending therefrom. The boss pieces have bores 55 of substantially the same bore 19 as those of the crown portion bosses 18. The boss pieces 50 further include circlip grooves 56 for axial location of the gudgeon-pin 30 (not shown).

Figure 2:
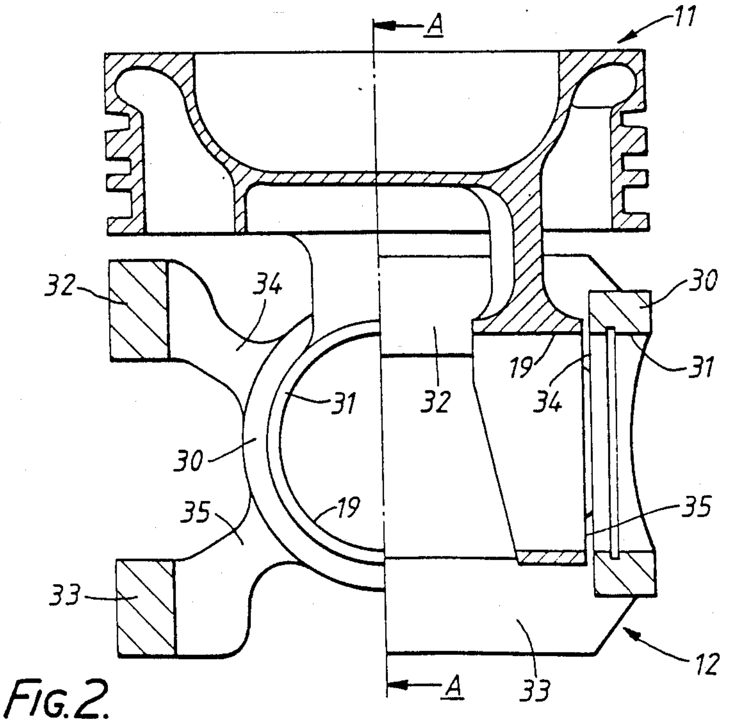
FIG. 2 shows a first alternative piston sectioned as in FIG. 1.

In further alternative embodiments of the invention the bearing lands 24 and 25 of FIG. 1 or lands 32 and 33 of FIG. 2 may be profiled so as to generate oil films for hydrodynamic lubrication of the piston in operation in accordance with known practice. Alternatively the portions 22 may not be machined away but the periphery of the skirt casting 21 may be suitably profiled as disclosed in U.S. Pat. No. 4,535,682 or PCT/GB85/0055. Any other known profiles may be employed to generate favourable distribution of the lubricant.

It will be evident to the person skilled in the art that where features such as, for example, circlips have been described for the axial location of gudgeon-pins that any other known method or device such as buttons in the pin ends may be used.

The invention has been described with reference to pistons having steel or cast-iron crown portions. Crown portions having air gaps incorporated into the combustion bowls are also envisaged. Pistons having crowns and combustion bowls of the type envisaged are disclosed in GB 2,125,517 of common ownership herewith.

What is claimed:

1. A piston comprising a crown portion which also includes a piston ring belt and gudgeon-pin bosses and which crown portion comprises a casting of steel or cast-iron and a separate articulated skirt portion comprising a casting of aluminum alloy, steel or cast-iron which also includes gudgeon-pin bores, said crown portion and said skirt portion having a common gudgeon-pin about which said articulated skirt portion is freely able to move relative to said crown portion, wherein portions of the skirt which co-operate with an associated cylinder or cylinder liner comprise axially-spaced circumferentially extending bearing lands, and said circumferentially extending bearing lands are arcuate, load bearing skirt lands supported by struts depending from gudgeon-pin boss pieces of the skirt portion.

2. A piston according to claim 1 wherein said skirt portion is an aluminium alloy die casting.

3. A piston according to claim 1 wherein said skirt portion is a ferrous alloy casting.

* * * * *